United States Patent
Takagi

(10) Patent No.: US 8,346,289 B2
(45) Date of Patent: Jan. 1, 2013

(54) BASE TRANSCEIVER STATION, MBMS BASE TRANSCEIVER STATION SYSTEM, METHOD OF DETERMINING TRANSMIT POWER, AND METHOD OF CONTROLLING TRANSMIT POWER

(75) Inventor: Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 361 days.

(21) Appl. No.: 12/812,470

(22) PCT Filed: Feb. 24, 2009

(86) PCT No.: PCT/JP2009/000810
§ 371 (c)(1),
(2), (4) Date: Jul. 12, 2010

(87) PCT Pub. No.: WO2009/110189
PCT Pub. Date: Sep. 11, 2009

(65) Prior Publication Data
US 2010/0291958 A1  Nov. 18, 2010

(30) Foreign Application Priority Data
Mar. 7, 2008 (JP) .................................. 2008-057485

(51) Int. Cl.
*H04B 7/00* (2006.01)
(52) U.S. Cl. ......... 455/509; 455/450; 455/522; 455/220
(58) Field of Classification Search ............ 455/69, 455/522, 561, 560, 509, 126, 103, 127, 452.1, 455/451, 450, 452, 213.4, 511, 504, 67.16, 455/67.11, 220; 370/218, 280, 329, 480
See application file for complete search history.

(56) References Cited

U.S. PATENT DOCUMENTS

| 5,715,526 | A * | 2/1998 | Weaver, Jr. et al. | 455/126 |
| 2004/0042394 | A1* | 3/2004 | Nielsen et al. | 370/218 |
| 2004/0235525 | A1* | 11/2004 | Chater-Lea | 455/561 |
| 2005/0111406 | A1* | 5/2005 | Pasanen et al. | 370/329 |
| 2005/0113140 | A1* | 5/2005 | Gruet et al. | 455/561 |
| 2008/0095081 | A1* | 4/2008 | Legg et al. | 370/280 |

FOREIGN PATENT DOCUMENTS

| JP | 2002261687 A | 9/2002 |
| JP | 2003209881 A | 7/2003 |
| JP | 2004215305 A | 7/2004 |
| JP | 2006254179 A | 9/2006 |

OTHER PUBLICATIONS

International Search Report for PCT/JP2o001000810 mailed May 26, 2009.

* cited by examiner

Primary Examiner — Tan Trinh

(57) ABSTRACT

A base transceiver station (200) that transmits same data through a common channel shared by a transmission path includes a cell total transmit power detector (41) that detects, with respect to each of a plurality of cells, a total amount of the transmit power for transmitting the data to mobile stations (300) located inside each of the cells, a relative value information receiver (42) that receives relative value information for relatively correcting the total transmit power, from the base transceiver station controller, and a weight adjustment and power determination unit (43) that corrects the total transmit power for transmitting the data with respect to each cell, based on the relative value information received by the relative value information receiver and the total transmit power detected by the cell total transmit power detector, and determines a modified total transmit power.

10 Claims, 4 Drawing Sheets

BASE TRANSCEIVER STATION, MBMS BASE TRANSCEIVER STATION SYSTEM, METHOD OF DETERMINING TRANSMIT POWER, AND METHOD OF CONTROLLING TRANSMIT POWER

TECHNICAL FIELD

The present invention relates to a base transceiver station, an MBMS base transceiver station system, a method of determining a transmit power, and a method of controlling the transmit power.

BACKGROUND ART

A technique called a Multimedia Broadcast and Multicast Service (hereinafter, MBMS) has recently been standardized for distributing multimedia contents such as motion pictures and music, under the Wideband-Code Division Multiple Access (W-CDMA) system.

The MBMS has enabled broadcasting service of the contents utilizing the Forward Access Channel (hereinafter, FACH), which has conventionally been serving as the common channel, to thereby save the radio resource in response to the increase in demand for the multimedia service.

The FACH refers to the downlink common channel transmitted by the base transceiver station, which is utilized for transmitting control information and user data.

Accordingly, for example in the case where the system related to the MBMS includes the base transceiver station and a base transceiver station controller, and a plurality of cells is present under control of the base transceiver station, the base transceiver station can allocate each of the cells with the FACH for distributing the contents and transmit the same contents to the respective FACH.

The FACH serving as the common channel in the MBMS will now be described as the related art, based on the foregoing case as the example.

The base transceiver station controller instructs a maximum transmit power value to the base transceiver station, with respect to each FACH of the cells under the control of the base transceiver station.

To control the transmit power of the FACH, the base transceiver station controller then notifies the base transceiver station of relative value information corresponding to the maximum transmit power value, which serves as the information for controlling the transmit power.

Upon receipt of the relative value information, the base transceiver station adds the power according to the relative value information received, to the transmit power of each FACH, to thereby modify the transmit power of the relevant FACH.

Regarding the MBMS, methods of controlling the transmit power, to be carried out by the base station controller, can be found in patent documents 1 to 3.

[Patent document 1] Japanese Laid-open patent publication No. 2003-209881
[Patent document 2] Japanese Laid-open patent publication No. 2004-215305
[Patent document 3] Japanese Laid-open patent publication No. 2006-254179

DISCLOSURE OF THE INVENTION

The technique disclosed in the foregoing documents, however, still has a room for improvement in the following aspects.

In the case where a Radio Network Controller (RNC) is to control the transmit power for a Secondary Common Control Physical Channel (hereinafter, SCCPCH) of each cell, shared by transmission paths in the MBMS system according to the 3rd Generation Partnership Project (hereinafter, 3GPP) scheme in which the MBMS is specified, the RNC transmits one transmit power control packet, to thereby apply that packet to the transmit power for the shared SCCPCH of all the cells.

Accordingly, although it is attempted to control the transmit power for the SCCPCH of each cell by the one transmit power control packet, the transmit power cannot be properly controlled because the traffic volume of the cells is different from each other.

The present invention has been accomplished in view of the foregoing situation, with an object to provide a base transceiver station and an MBMS base transceiver station system that can optimally control the transmit power, which is the radio resource, with respect to each cell, and a method of determining the transmit power and controlling the same that allow optimally controlling the transmit power.

According to the present invention, there is provided a base transceiver station that transmits same data through a common channel shared by a transmission path, comprising:

a cell total transmit power detector that detects, with respect to each of a plurality of cells, a total amount of the transmit power for transmitting the data to a mobile station located inside each of the cells;

a relative value information receiver that receives relative value information for relatively correcting the total transmit power, from the base transceiver station controller; and a weight adjustment and power determination unit that corrects the total transmit power for transmitting the data with respect to each cell, based on the relative value information received by the relative value information receiver and the total transmit power detected by the cell total transmit power detector, and determines a modified total transmit power.

According to the present invention, there is provided an MBMS base transceiver station system comprising a base transceiver station that transmits same data through a common channel shared by a transmission path, a base transceiver station controller that controls a transmit power of the base transceiver station, and a mobile station located inside each of a plurality of cells controlled by the base transceiver station, wherein the base transceiver station controller includes:

a relative value information transmitter that transmits, to the base transceiver station, relative value information for relatively correcting the total transmit power for transmission of the data by the base transceiver station through the transmission path, with respect to each cell; and the base transceiver station includes:

a cell total transmit power detector that detects the total amount of the transmit power for transmitting the data to the mobile station, with respect to each cell;

a relative value information receiver that receives the relative value information transmitted by the relative value information transmitter; and a weight adjustment and power determination unit that corrects the total transmit power for transmitting the data with respect to each cell, based on the relative value information received by the relative value information receiver and the total transmit power detected by the cell total transmit power detector, and determines a modified total transmit power.

According to the present invention, there is provided a method of determining a transmit power, with a base transceiver station that transmits same data through a common channel shared by a transmission path, a base transceiver station controller that controls a transmit power of the base transceiver station, and a mobile station located inside each of a plurality of cells controlled by the base transceiver station, comprising:

detecting at the base transceiver station a cell total transmit power for transmitting the data to the mobile station, with respect to each cell;

transmitting from the base transceiver station controller to the base transceiver station, relative value information for relatively correcting the total transmit power for transmission of the data by the base transceiver station through the transmission path, with respect to each cell;

receiving at the base transceiver station the relative value information transmitted from the base transceiver station controller; and correcting by weight adjustment, at the base transceiver station, the total transmit power for transmitting the data with respect to each cell, based on the relative value information received at the base transceiver station and the total transmit power detected at the base transceiver station, and determining a modified total transmit power.

According to the present invention, there is provided a method of controlling a transmit power in a base transceiver station that transmits same data through a common channel shared by a transmission path, comprising:

detecting, with respect to each of a plurality of cells, a total transmit power for transmitting the data to a mobile station located inside each of the cells;

receiving relative value information for relatively correcting the total transmit power, from a base transceiver station controller; and correcting by weight adjustment the total transmit power for transmitting the data with respect to each cell, based on the relative value information that has been received and the total transmit power that has been detected, and determining a modified total transmit power.

The present invention provides a base transceiver station and an MBMS base transceiver station system that can optimally control the transmit power, which is the radio resource, with respect to each cell, and a method of determining the transmit power and controlling the same that allow optimally controlling the transmit power.

BRIEF DESCRIPTION OF THE DRAWINGS

The foregoing and other objects, features and advantages will become more apparent through preferred embodiments described below and the accompanying drawings.

BEST MODE FOR CARRYING OUT THE INVENTION

Figure 1:
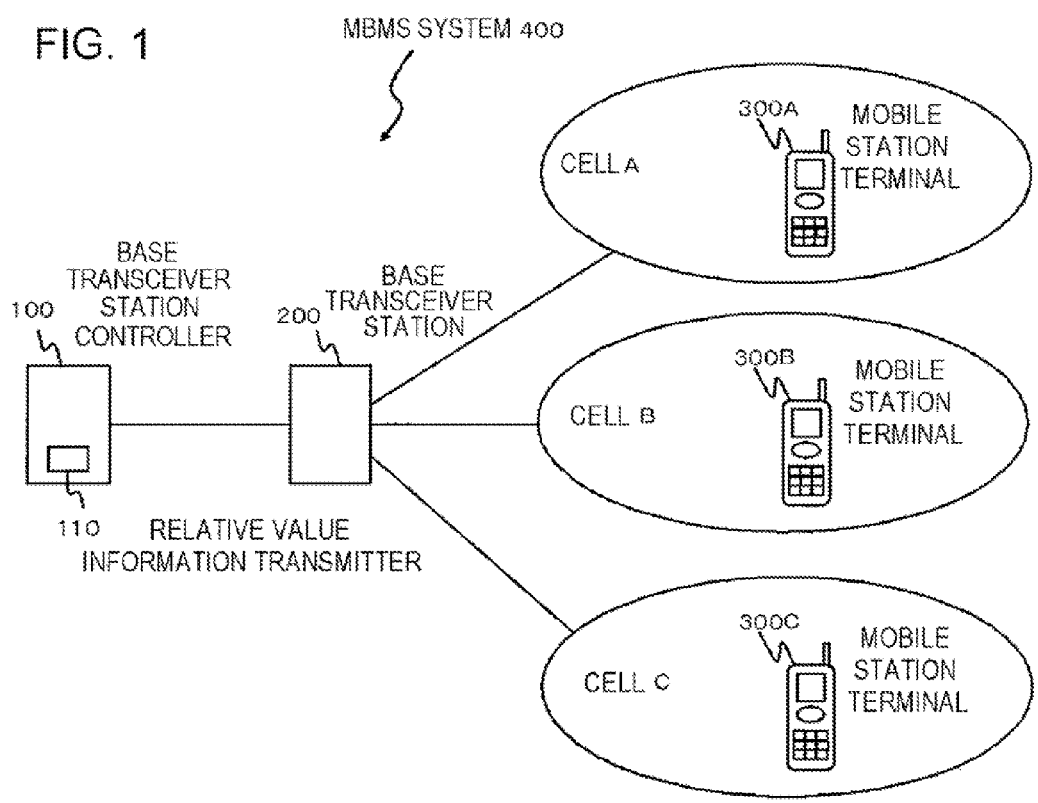
FIG. 1 is a block diagram showing an overall configuration of an MBMS system according to an embodiment.

Hereunder, an embodiment of the present invention will be described referring to the drawings. In all the drawings, the same constituents will be given the same numeral, and the description thereof will not be repeated.

First, an MBMS system 400 according to the embodiment of the present invention is shown in FIG. 1.

FIG. 1 shows an overall configuration of the MBMS system 400 according to this embodiment.

The MBMS system 400 shown in FIG. 1 includes a base transceiver station controller 100, a base transceiver station 200, a mobile station terminal 300A located in a cell A, a mobile station terminal 300B located in a cell B, and a mobile station terminal 300C located in a cell C.

The base transceiver station controller 100 transmits data representing a multimedia content (hereinafter, multimedia content data) through the base transceiver station 200, via a common channel shared by transmission paths.

The base transceiver station controller 100 also transmits relative value information RI for relatively controlling the total transmit power being output by the base transceiver station 200 to each cell.

To be more detailed, the base transceiver station controller 100 includes a relative value information transmitter 110 that transmits to the base transceiver station 200 the relative value information RI for relatively correcting the total transmit power by which the base transceiver station 200 is transmitting the multimedia content data through the transmission path to each cell.

The relative value information RI is to be applied to the transmit power by which the base transceiver station 200 transmits the same data such as the multimedia content data to the SCCPCH of all the cells (cell A to cell C in FIG. 1), in a form of transmit power control packet transmitted by the base transceiver station controller 100 to the base transceiver station 200, in the MBMS system in which the common channel is shared by the transmission paths according to the 3GPP scheme.

The transmit power herein refers to the power by which the base transceiver station 200 transmits the multimedia content data to the mobile station terminals 300 (including the mobile station terminals 300A to 300C) in the cells, through the SCCPCH which is the common channel.

Also, the base transceiver station controller 100 has such functions as controlling a wireless network including handover, and coding a sound for processing a voice on the phone.

The base transceiver station 200 transmits the multimedia content data such as motion pictures or music, to a plurality of mobile station terminals 300 in each cell through the SCCPCH serving as the common channel. In other words, the base transceiver station 200 transmits same data through the common channel shared by the transmission paths.

Further, the base transceiver station 200 calculates an amount respective cell under the control of the base transceiver station 200 by which the total transmit power being output is to be relatively corrected (hereinafter, relative transmit power correction amount) based on the relative value information RI transmitted by the base transceiver station controller 100.

The total transmit power herein refers to the total amount of the transmit power for the respective cell, out of the transmit power being output by the base transceiver station 200 to the mobile station terminals 300.

Further, the base transceiver station 200 according to this embodiment adjusts the weight, which will be described later, of the calculated relative transmit power correction amount, and adds the adjusted amount to the total transmit power being output.

The mobile station terminals 300A to 300C are mobile terminals that receive through the base transceiver station 200 the multimedia content data such as motion pictures or music, transmitted from the base transceiver station controller 100 by means of the transmission paths sharing the common channel.

Hereinafter, in the case where it is not necessary to specify a particular one among the mobile station terminal 300A, the mobile station terminal 300B, and the mobile station terminal 300C, the terminal will be simply referred to as the mobile station terminal 300.

Figure 2:
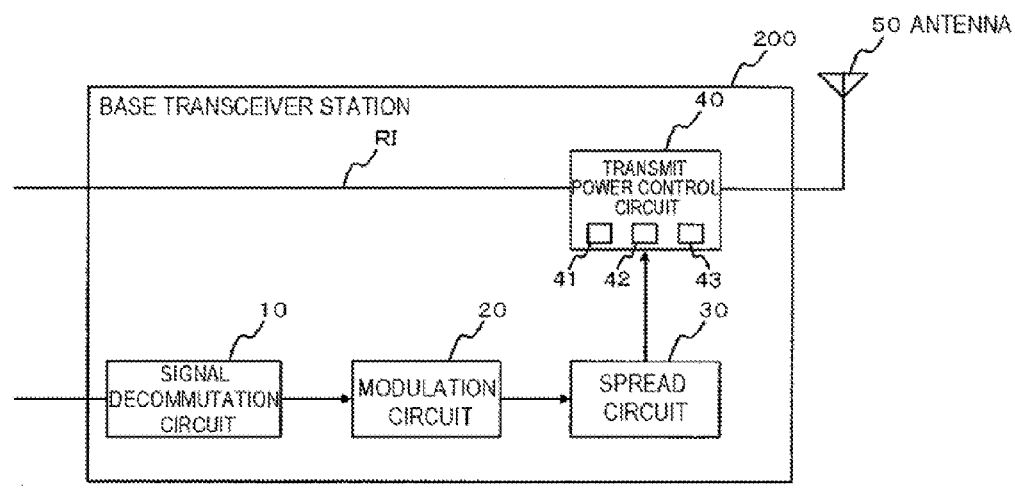
FIG. 2 is a block diagram showing a configuration of a base transceiver station according to the embodiment.

The base transceiver station 200 according to this embodiment is shown in FIG. 2.

FIG. 2 is a block diagram representing the base transceiver station 200 according to this embodiment.

The base transceiver station 200 shown in FIG. 2 includes a signal decommutation circuit 10, a modulation circuit 20, a spread circuit 30, a transmit power control circuit 40, and an antenna 50.

The constituents of the base transceiver station 200 operate as follows.

The signal decommutation circuit 10 has a function of decommutating the signal transmitted from the base transceiver station controller 100, which is a multiplex signal of sound data and so on, into each single communication channel carrying data code such as the sound.

The modulation circuit 20 has a function of modulating the data code of each communication channel, so that radio wave can carry the data.

In this embodiment, for example, a Binary Phase Shift Keying (hereinafter, BPSK) mode may be adopted for the uplink transmission, and a Quadrature Phase Shift Keying (hereinafter, QPSK) mode for the downlink transmission. Here, since the BPSK and QPSK are both popularly adopted modes, the description thereof will not be provided.

The spread circuit 30 has the function of executing spread modulation with a spread code on the signal modulated by the modulation circuit 20, thereby spreading the spectrum.

The Spread Spectrum (SS) herein refers to a technique of spreading a communication signal to a wider band than its original band.

The transmit power control circuit 40 has a function of amplifying the transmit power of the signal, which has undergone the spectrum-spreading by the spread circuit 30.

The transmit power control circuit 40 includes a cell total transmit power detector 41, a relative value information receiver 42, and a weight adjustment and power determination unit 43.

The cell total transmit power detector 41 detects, with respect to each of a plurality of cells, a total transmit power for transmitting the multimedia content data to the mobile stations 300 located inside each cell.

The relative value information receiver 42 receives from the base transceiver station controller 100 the relative value information RI for relatively correcting the total transmit power for transmitting the multimedia content data, with respect to each cell.

The weight adjustment and power determination unit 43 corrects the total transmit power for transmitting the multimedia content data, with respect to each cell, based on the relative value information RI received by the relative value information receiver 42 and the total transmit power detected by the cell total transmit power detector 41, and determines the modified total transmit power.

Thus, the transmit power control circuit 40 has the function of the cell total transmit power detector 41, that of the relative value information receiver 42, and that of the weight adjustment and power determination unit 43.

The antenna 50 has a function of transmitting the spread-spectrum signal, the transmit power of which has been amplified by the transmit power control circuit 40, to the mobile station terminals 300.

It is to be noted that this embodiment is intended to describe that the base transceiver station 200 is configured to receive the relative value information RI and adjust the weight according to the total transmit power for each cell, to thereby determine the total transmit power with respect to each cell. The function of the base transceiver station 200, of demodulating the signal transmitted from the mobile station terminal 300 is a widely known technique, and hence the description thereof will not be provided.

In the transmit power control circuit 40 according to this embodiment, an upper limit of the total transmit power is set with respect to all the cells under the control of the base transceiver station 200, and a threshold ($\alpha$), expressed by a ratio of the total transmit power being output with respect to the upper limit, is also set therein.

In the case where the total transmit power being output to each cell exceeds the threshold value ($\alpha$), the transmit power control circuit 40 adjusts the weight of the relative transmit power correction amount in proportion to the amount of excess above the threshold ($\alpha$), and adds the weight-adjusted relative transmit power correction amount to the total transmit power being output, thus determining the total transmit power, in other words the modified total transmit power.

In contrast, in the case where the total transmit power for the respective cell is not higher than the predetermined threshold ($\alpha$), the transmit power control circuit 40 makes an adjustment of zero on the weight of the relative transmit power correction amount (equivalent to the original state without the weight adjustment), and adds the relative transmit power correction amount as it is to the total transmit power being output, thus determining the total transmit power for the relevant cell.

Thus, the weight adjustment and power determination unit 43 adjusts the weight in proportion to the amount of excess in the case where the total transmit power detected by the cell total transmit power detector 41 is higher than the threshold, and makes an adjustment of zero on the weight of the relative value information in the case where the total transmit power detected by the cell total transmit power detector 41 is not higher than the threshold.

A specific example will be given hereunder, about the weight adjustment of the relative transmit power correction amount.

In this embodiment, the weight adjustment and power determination unit 43 calculates the weight adjustment of the relative value information RI based on the total transmit power detected by the cell total transmit power detector 41, and adds to the total transmit power the relative value information RI to which the calculated weight adjustment has been applied, thereby correcting the total transmit power and thus determining the modified total transmit power, with respect to each cell.

Figure 3:
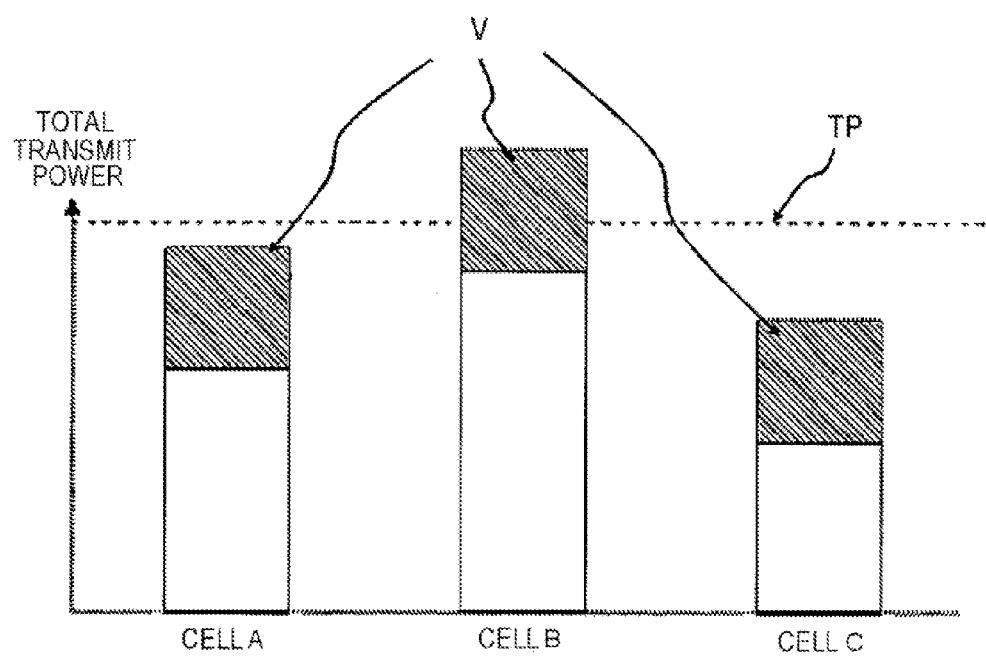
FIG. 3 is a chart showing an example of addition of a relative transmit power correction amount according to the embodiment, to a total transmit power being output to each cell.

FIG. 3 represents the case where the relative transmit power correction amount, corresponding to the correction amount according to the embodiment, is added as it is to the total transmit power being output to each cell.

The cells shown in FIG. 3 respectively correspond to the cell A, the cell B, and the cell C shown in FIG. 1, and the total transmit power for the respective cells varies depending on the number of mobile station terminals 300 located therein and the traffic volume.

The correction amount V for each cell is uniformly added to the total transmit power for each cell, according to the relative value information RI.

FIG. 3 includes a total transmit power upper limit TP, which is the upper limit of the total transmit power for the cells, and in this embodiment the weight can be adjusted according to a difference between the current total transmit power and the total transmit power upper limit TP, as will be described later.

Regarding the cell A shown in FIG. 3, the total transmit power from the base transceiver station 200 to the cell A becomes close to the total transmit power upper limit TP, when the correction amount V, in other words the relative transmit power correction amount, is added.

In the case of the cell B shown in FIG. 3, the total transmit power from the base transceiver station 200 to the cell B exceeds the total transmit power upper limit TP, when the correction amount V, i.e. the relative transmit power correction amount, is added.

In the case of the cell C shown in FIG. 3, the total transmit power from the base transceiver station 200 to the cell C is still considerably lower than the total transmit power upper limit TP, though the correction amount V, i.e. the relative transmit power correction amount, is added.

In this example, the current total transmit power before the addition of the relative transmit power correction amount is 60% of the total transmit power upper limit TP in the cell A, 95% of the total transmit power upper limit TP in the cell B, and 40% of the total transmit power upper limit TP in the cell C.

According to this embodiment, the threshold ($\alpha$) is set at 50% for example, with respect to the total transmit power upper limit TP, so that in the case where the total transmit power exceeds such threshold ($\alpha$) the weight of the relative transmit power correction amount is adjusted, and the weight-adjusted relative transmit power correction amount is added to the total transmit power being output, to thereby determine the modified total transmit power for each cell.

To calculate the weight adjustment of the relative transmit power correction amount, the following formula may be adopted.

$$\text{Weight-adjusted correction amount} = \text{correction amount} \times (100 - (\text{total transmit power}(\%) - \alpha(\%)) \times 2) \quad (1)$$

The formula (1) is an example for calculating the weight-adjusted correction amount. The case where the weight of the relative transmit power correction amount is adjusted according to the formula (1) will be described hereunder. In this embodiment, the weight-adjusted correction amount is calculated by applying a percentage to the correction amount V.

Figure 4:
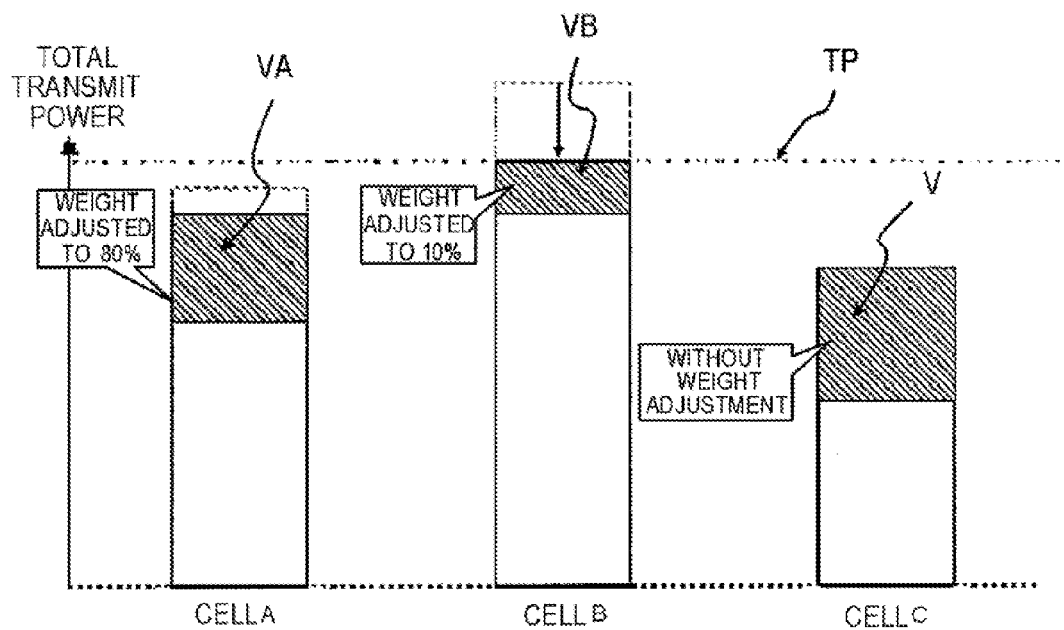
FIG. 4 is a chart showing an example of determination of the total transmit power of each cell, by adjusting a weight of the relative transmit power correction amount according to the embodiment.

FIG. 4 represents an example of calculating the weight-adjusted correction amount according to the formula (1), adding the weight-adjusted correction amount (VX) to the total transmit power being output, and determining the modified total transmit power for each cell, according to the embodiment.

First, in the cell A shown in FIG. 4, since the total transmit power is 60% of the total transmit power upper limit TP, the weight adjustment of the correction amount is calculated as 80% according to the formula (1), and the correction amount VA with the weight adjusted to 80% is added to the total transmit power being output, and thus the modified total transmit power is determined.

In the cell B shown in FIG. 4, since the total transmit power is 95% of the total transmit power upper limit TP, the weight adjustment of the correction amount is calculated as 10% according to the formula (1), and the correction amount VB with the weight adjusted to 10% is added to the total transmit power being output, and thus the modified total transmit power is determined.

In the cell C shown in FIG. 4, since the total transmit power is 40% of the total transmit power upper limit TP, which is equal to or less than the threshold of 50% according to this embodiment, the weight adjustment of the correction amount becomes zero (no weight adjustment), and the relative transmit power correction amount (correction amount V) is added as it is to the total transmit power being output, and thus the modified total transmit power is determined.

Thus, the MBMS system 400 according to this embodiment is capable of controlling the total transmit power for each of the cells in accordance with the number of mobile station terminals 300 being used and the service utilization status of the individual mobile station terminal 300.

In the MBMS system 400, the base transceiver station 200 can control the total transmit power according to the traffic status, by construing the total transmit power as the traffic volume.

As described above, the base transceiver station 200 of the MBMS system 400 according to this embodiment can optimally control the total transmit power, which is the resource, with respect to each of the cells.

It is to be noted that this embodiment is intended to describe the weight adjustment of the relative transmit power correction amount (correction amount v), and the weight may be adjusted in various manners according to the status of each cell, without limitation to the threshold ($\alpha$) and the formula (1).

Regarding the weight-adjusted correction amount (VX) to be added to the total transmit power for each cell, naturally a negative value may be added so that the total transmit power is reduced, without limitation to a positive value.

In this case, this embodiment since the base transceiver station 200 can make a negative adjustment on the weight of the relative transmit power correction amount (correction amount V), the overall transmit power of the MBMS system can be attenuated.

In this case, further, since the transmit power of the MBMS system transmitted by the base transceiver station 200 can be attenuated as a whole, the transmit power corresponding to the attenuated amount can be allocated to an individual channel, to thereby not only maintain the communication quality to a mobile station terminal 300 located at a border of the cell, but improve the reception quality of such mobile station terminal 300.

Although the embodiment of the present invention has been described as above referring to the drawings, it is to be understood that the embodiment is merely exemplary and that various modifications may be made.

This application is the National Phase of PCT/JP2009/000810, filed Feb. 24, 2009, which claims priority based on the Japanese patent application No. 2008-057485 filed on Mar. 7, 2008, the content of which is incorporated hereinto by reference in its entirety.

The invention claimed is:

1. A base transceiver station that transmits same data through a common channel shared by a transmission path, comprising:
   a cell total transmit power detector that detects, with respect to each of a plurality of cells, a total amount of said transmit power for transmitting said data to a mobile station located inside each of said cells;

a relative value information receiver that receives relative value information for relatively correcting said total transmit power, from said base transceiver station controller; and
a weight adjustment and power determination unit that corrects said total transmit power for transmitting said data with respect to each cell, based on said relative value information received by said relative value information receiver and said total transmit power detected by said cell total transmit power detector, and determines a modified total transmit power.

2. The base transceiver station according to claim 1,
wherein said weight adjustment and power determination unit calculates said weight adjustment of said relative value information based on said total transmit power detected by said cell total transmit power detector, and adds to said total transmit power said relative value information to which said calculated weight adjustment has been applied, and determines said modified total transmit power, with respect to each cell.

3. The base transceiver station according to claim 2,
wherein said weight adjustment and power determination unit adjusts said weight according to a difference between said total transmit power detected by said cell total transmit power detector and an upper limit value of said total transmit power.

4. The base transceiver station according to claim 2,
wherein said upper limit is set on said total transmit power and a threshold expressed by a ratio of said total transmit power being output with respect to said upper limit is specified for each cell; and
said weight adjustment and power determination unit adjusts, in the case where said total transmit power detected by said cell total transmit power detector exceeds said threshold, said weight in proportion to an amount of excess above said threshold, and
makes an adjustment of zero on said weight of said relative value information, in the case where said total transmit power detected by said cell total transmit power detector is not higher than said threshold value.

5. An MBMS base transceiver station system comprising a base transceiver station that transmits same data through a common channel shared by a transmission path, a base transceiver station controller that controls a transmit power of said base transceiver station, and a mobile station located inside each of a plurality of cells controlled by said base transceiver station,
wherein said base transceiver station controller includes:
a relative value information transmitter that transmits, to said base transceiver station, relative value information for relatively correcting said total transmit power for transmission of said data by said base transceiver station through said transmission path, with respect to each cell; and
said base transceiver station includes:
a cell total transmit power detector that detects said total transmit power for transmitting said data to said mobile station, with respect to each cell;
a relative value information receiver that receives said relative value information transmitted by said relative value information transmitter; and
a weight adjustment and power determination unit that corrects said total transmit power for transmitting said data with respect to each cell, based on said relative value information received by said relative value information receiver and said total transmit power detected by said cell total transmit power detector, and determines a modified total transmit power.

6. The MBMS base transceiver station system according to claim 5,
wherein said weight adjustment and power determination unit calculates said weight adjustment of said relative value information based on said total transmit power detected by said cell total transmit power detector, and adds to said total transmit power said relative value information to which said calculated weight adjustment has been applied, and determines said modified total transmit power, with respect to each cell.

7. A method of determining a transmit power, with a base transceiver station that transmits same data through a common channel shared by a transmission path, a base transceiver station controller that controls a transmit power of said base transceiver station, and a mobile station located inside each of a plurality of cells controlled by said base transceiver station, comprising:
detecting at said base transceiver station a cell total transmit power for transmitting said data to said mobile station, with respect to each cell;
transmitting from said base transceiver station controller to said base transceiver station, relative value information for relatively correcting said total transmit power for transmission of said data by said base transceiver station through said transmission path, with respect to each cell;
receiving at said base transceiver station said relative value information transmitted in said transmitting step; and
correcting by weight adjustment, at said base transceiver station, said total transmit power for transmitting said data with respect to each cell, based on said relative value information received in said receiving step and said total transmit power detected in said detecting step, and determining a modified total transmit power.

8. The method according to claim 7,
wherein said correcting by weight adjustment includes calculating said weight adjustment of said relative value information based on said total transmit power detected by said cell total transmit power detector, and adding to said total transmit power said relative value information to which said calculated weight adjustment has been applied, and determines said modified total transmit power, with respect to each cell.

9. A method of controlling a transmit power in a base transceiver station that transmits same data through a common channel shared by a transmission path, comprising:
detecting, with respect to each of a plurality of cells, a total transmit power for transmitting said data to a mobile station located inside each of said cells;
receiving relative value information for relatively correcting said total transmit power, from a base transceiver station controller; and
correcting by weight adjustment said total transmit power for transmitting said data with respect to each cell, based on said relative value information received in said receiving step and said total transmit power detected in said detecting step, and determining a modified total transmit power.

10. The method according to claim 9,
wherein said correcting by weight adjustment includes calculating said weight adjustment of said relative value information based on said total transmit power detected by said cell total transmit power detector, and adding to said total transmit power said relative value information to which said calculated weight adjustment has been applied, and determines said modified total transmit power, with respect to each cell.

* * * * *